United States Patent Office 2,710,539
Patented June 14, 1955

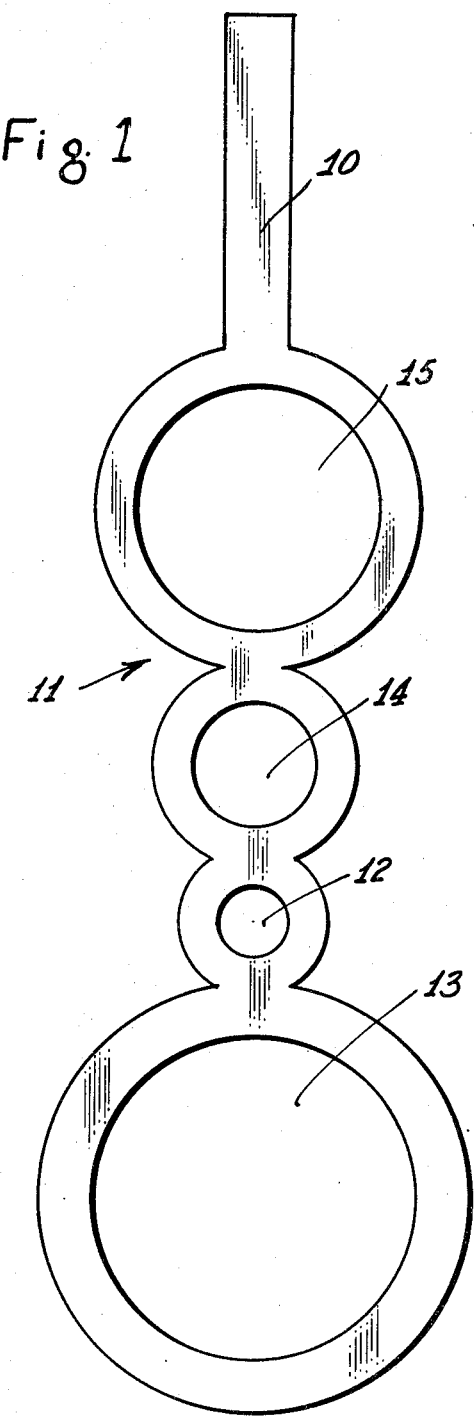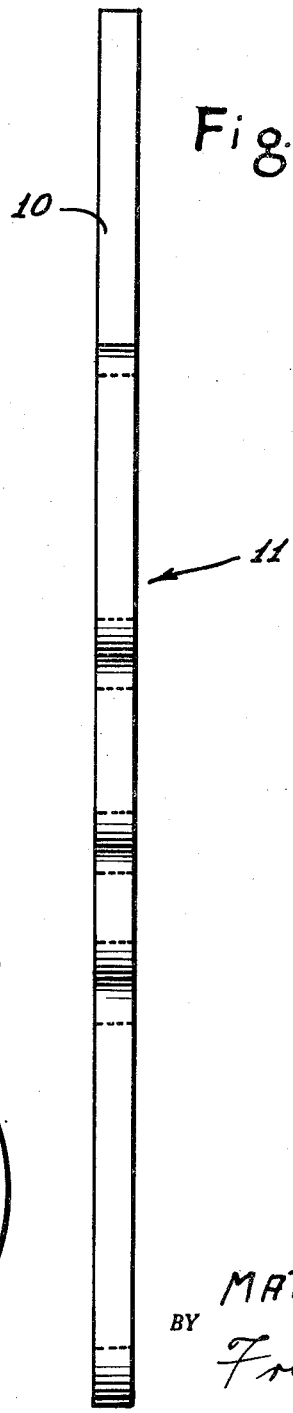

2,710,539
SURFACE TENSION METER

Martin Pollack, Brooklyn, N. Y.

Application January 18, 1954, Serial No. 404,749

1 Claim. (Cl. 73—53)

This invention relates to a surface tension meter.

It is an object of this invention to provide a surface tension meter of simple and economical construction.

It is another object of this invention to provide a surface tension meter adapted to rapidly measure the surface tension of solutions.

The principle disadvantage of presently employed surface tension meters is that they are expensive and furthermore are cumbersome to use.

What is needed is a simple inexpensive device capable of producing a rapid determination of the surface tension or wetting power of a solution thereby facilitating a saving of time and money.

According to this invention the surface tension of a solution may be measured rapidly by non-technical men by the simple step of dipping the device in the solution under test and removal therefrom.

The maximum aperture which may be filmed over by a solution is a measure of the surface tension of the solution. According to this invention a plurality of apertures of varying area and/or configuration are cut into a sheet of material and the maximum aperture filmed over after removal of the device from the solution under test is a measure of the surface tension. Accurate measurements or readings may be made by calibrating the device of this invention against solutions of known surface tensions, thereby establishing readings for each aperture.

This invention is disclosed by means of an illustrative description and an accompanying drawing in which;

Fig. 1 is a front view of the surface tension meter and

Fig. 2 is a side view of the surface tension meter.

Referring to the drawing the surface tension meter is made from sheet material of suitable thickness and preferably of material resistant to corrosion, for example, plastic, stainless steel, and the like. The meter is provide with a handle 10 to which a body section having a plurality of apertures is integrally united. The apertures may be circular, rectangular, elliptical or of any desired configuration. The apertures are preferably disposed in linear relationship but they need not be disposed one behind the other. Preferably the apertures are disposed with the size of the apertures increasing or decreasing relative to the distance away from handle 10, but as shown in the embodiment of Fig. 1 the smallest aperture 12 is disposed between the largest aperture 13 and an aperture 14 of intermediate size. Another aperture 15 of a size intermediate that of aperture 14 and 13 is disposed in the body portion 11 adjacent the handle 10.

This invention is illustrated by an embodiment thereof but clearly many other embodiments are embraced within the scope of this invention concept as disclosed above and all these embodiments are intended to be embraced with the claim herein.

I claim:

A surface tension meter consisting of a flat member, said flat member comprising a handle section and a plurality of linearly disposed successive rings the apertures of which are of varying diameters, said handle section being integrally and linearly secured to said plurality of rings.

References Cited in the file of this patent

UNITED STATES PATENTS 1,960,224  Schoenberg _____ May 22, 1934

FOREIGN PATENTS 466,653  Germany _____ Oct. 10, 1928